(12) United States Patent
Rauscher (10) Patent No.: US 12,354,431 B2
(45) Date of Patent: Jul. 8, 2025

(54) METHOD AND SENSOR FOR TESTING VALUE DOCUMENTS

(71) Applicant: GIESECKE+DEVRIENT CURRENCY TECHNOLOGY GMBH, Munich (DE)

(72) Inventor: Wolfgang Rauscher, Parkstetten (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 184 days.

(21) Appl. No.: 18/017,312

(22) PCT Filed: Jul. 8, 2021

(86) PCT No.: PCT/EP2021/025250
§ 371 (c)(1),
(2) Date: Jan. 20, 2023

(87) PCT Pub. No.: WO2022/017640
PCT Pub. Date: Jan. 27, 2022

(65) Prior Publication Data
US 2023/0316842 A1    Oct. 5, 2023

(30) Foreign Application Priority Data
Jul. 23, 2020   (DE) .................... 10 2020 004 471.9

(51) Int. Cl.
*G07D 7/202*  (2016.01)
*G01N 21/64*  (2006.01)
*G07D 7/1205* (2016.01)

(52) U.S. Cl.
CPC ......... *G07D 7/205* (2013.01); *G01N 21/6408* (2013.01); *G01N 21/643* (2013.01); *G07D 7/1205* (2017.05)

(58) Field of Classification Search
CPC .. G07D 7/205; G07D 7/1205; G01N 21/6408; G01N 21/643
See application file for complete search history.

(56) References Cited

U.S. PATENT DOCUMENTS 9,031,307 B2   5/2015  Giering
9,989,411 B2   6/2018  Deckenbach et al.
(Continued)

FOREIGN PATENT DOCUMENTS

WO   2005036481 A1   4/2005
WO   2011063317 A2   5/2011
(Continued)

OTHER PUBLICATIONS

WO 2017/118466 A1 and an English translation. (Year: 2017).*
(Continued)

*Primary Examiner* — Chih-Cheng Kao
(74) *Attorney, Agent, or Firm* — Workman Nydegger (57) ABSTRACT

A method for checking value documents, in particular with regard to their authenticity and/or with regard to their value-document type, involves the following steps: detecting a first plurality of intensity courses on a value document, combining the first plurality of intensity courses or a second plurality of intensity courses selected from the first plurality into a combined intensity course, determining a time constant τ of the combined intensity course, checking the value document based on the time constant τ of the combined intensity course. A corresponding sensor is provided for checking value documents, and an apparatus enables value-document processing with the aforementioned sensor.

16 Claims, 2 Drawing Sheets

(56) References Cited

U.S. PATENT DOCUMENTS

| | | | |
|---|---|---|---|
| 2007/0057198 A1* | 3/2007 | Wilson | G07D 7/1205 |
| | | | 250/458.1 |
| 2007/0189595 A1 | 8/2007 | Giering | |
| 2014/0097359 A1 | 4/2014 | Vasic et al. | |
| 2015/0348351 A1 | 12/2015 | Deckenbach et al. | |
| 2016/0171810 A1 | 6/2016 | Dossey | |
| 2020/0273279 A1* | 8/2020 | Rauscher | G07D 7/12 |
| 2021/0019976 A1* | 1/2021 | Kerst | G07F 7/10 |

FOREIGN PATENT DOCUMENTS

| | | |
|---|---|---|
| WO | 2012167894 A1 | 12/2012 |
| WO | 2014095055 A1 | 6/2014 |

OTHER PUBLICATIONS

WO 2017/118467 A1 and an English translation (Year: 2017).*
International Search Report from PCT Application No. PCT/EP2021/025250, Oct. 15, 2021.
Search Report from corresponding German Application No. DE 102020004471.9, Mar. 25, 2021.

* cited by examiner

METHOD AND SENSOR FOR TESTING VALUE DOCUMENTS

BACKGROUND

The present invention relates to a sensor and a method for checking value documents and to a value-document processing apparatus which has the sensor.

For checking value documents, it is usual to employ sensors with which the type of the value documents is determined and/or with which the value documents are checked for authenticity and/or for their state. Such sensors are for example employed for checking value documents, such as bank notes, checks, identity cards, credit cards, cheque cards, tickets, vouchers and the like. The value documents are checked in an apparatus which, depending on the value-document properties to be checked, contains one or several different sensors. For checking the value documents, these are in the process usually transported past the stationary sensor(s), for example in a value document processing device.

A value document to be checked can have one or several security features, such as luminescent substances, magnetic substances, etc. For checking the value document, for example, the decay time or time constant of the intensity time course of the luminescence and/or the spectral properties of the luminescence are checked in the case of a luminescent substance. For checking the decay time of the luminescence, it is in the process known to excite value documents with excitation pulses, in particular to illuminate them with light pulses, and to detect the luminescence intensity of the value document at different time points after the end of the excitation pulse in the dark phase between the excitation or light pulses. For example, the decay time of a mono-exponential decay of the luminescence is then determined from the time decay of the luminescence intensity.

The luminescent substance(s) to be checked of the value document can in the process be present in some regions or over the full area on or in the value document, for example introduced into the substrate or printed onto the substrate or value document, and/or can also be covered or shielded in some regions, for example by a security element, such as a further print or a patch or LEAD strip. In other words, the luminescent substance to be checked can be present either homogeneously over the full area on or in the bank note, or else can be applied to the bank note in a patterned manner as a component of a printing ink. In both cases, an overprinting can be present above the luminescent substance, which absorbs parts of the excitation and/or emission radiation of the luminescent substance. This results in spatial structures in the measurable luminescence intensity. In the case of a printed luminescence feature, no luminescence at all can be measured outside the printed region. In general, a value document therefore has a local variation in the luminescence intensity achieved at a given excitation due to these spatial structures in the density of the luminescent substance and/or its shielding. In the process, these spatial structures or the local variation of the achievable luminescence intensity, for example in the case of bank notes of different denominations, can be different.

At the same time, in known value-document processing apparatuses, the value documents are usually moved quickly past the stationary sensor during the check, for example at a transport speed of 1 to 12 m/s. Even in the case of such rapidly moving value documents, the value document is illuminated with an excitation pulse, for example an illumination flash, in order to excite the luminescent substance, and then the luminescence intensity is scanned at finitely many different time points in order to establish the decay behavior of the luminescence. In this manner, a temporally discretely sampled decay curve is obtained as a data record, wherein for each of the individual measurements different points of the value document are located in the detection region of the detector, since the value document moves on between the discrete time points of measurement of a given decay curve. Accordingly, the luminescence intensity is generally measured at the beginning of the decay curve from a different point on the value document than at the end of the decay curve. At a transport speed of 10 m/s, a time interval of 100 µs corresponds to a spatial distance of 1 mm. This distance is large compared to the spatial structures of a printed image, but small compared to the overall size of the value document. Such decay curves can therefore be recorded at many points of a moving value document in order to obtain a spatial distribution of the decay behavior. For a precise check of the value document, the length of the measured decay curve, i.e. the latest time point of measurement, is adapted to the expected decay behavior of the luminescence. A large spatial distance between the first and the last measurement point thus arises in particular for high transport speeds in the range of 1-12 m/s and long decay times in the range of 80 µs to 2 ms.

Correspondingly, in particular in the case of a high transport speed and/or in the case of a long decay time of the luminescence of the value document, a decay curve or an intensity time course of the luminescence is detected which, as a result of the transport movement and the spatial structures, is possibly falsified in comparison to an intensity course detected on a stationary value document. Since—as mentioned—a bank note continues to move during the measurement of the decay curve, there can be at the beginning of the decay curve a point with undisturbed luminescence intensity and there can be at the end of the decay curve a point at which the intensity is reduced not only by the decay of the luminescence, but additionally by a further effect, in particular by a security element present above the luminescent substance, such as, for example, by an intensity-reducing overprinting, a see-through register or a hologram. In this case, the decay curve drops more rapidly than expected, and the established decay parameter indicates a more rapidly decaying luminescence feature than the luminescence feature actually employed.

Conversely, the bank note can move during the measurement of the decay curve from a point which is disturbed as to intensity to a point which is undisturbed as to intensity. In this case, the decay curve drops more slowly than expected, and the established decay parameter indicates a more slowly decaying luminescence feature than the luminescence feature actually employed. In extreme cases, the measured luminescence intensity can also show a non-monotonic course and can first rise and subsequently drop.

In both cases, the course of the measured luminescence intensity is not mono-exponential or does not show the functional form which is expected for the luminescence feature used. As a result, at high transport speeds and/or for long decay times of the luminescence of the value document, the decay time of the luminescence can be determined, where applicable, only imprecisely and only with great uncertainties.

However, even in the case of moving value documents it is desirable to determine the decay time of the luminescence of a luminescent substance present in the value document as precisely as possible. This is because the more precisely one can determine the decay behavior, the closer one can set the thresholds when checking the value document, for example the bank note, and the higher the anti-forgery security.

SUMMARY

An object of the present invention is to provide a method and a sensor for checking value documents, by means of which the time constant of a luminescence of the value document can be determined at high transport speeds with improved accuracy or reliability.

According to the invention, the value documents to be checked, in particular bank notes, are transported past a sensor in a transport direction, wherein the value documents have a security feature with a luminescent substance which, in reaction to a correspondingly suitable excitation by an excitation source, preferably by an excitation pulse, emits a luminescence which has as a function of time t relative to the excitation time, in particular to the excitation pulse or its end, an intensity course, in particular a decaying intensity course, with a characteristic decay time or time constant $\tau_0$. The characteristic time constant $\tau_0$, which the intensity course of the luminescence of the value document has, lies, for example, in the range of 10 µs to 5 ms, preferentially in the range of 80 µs to 2 ms.

The method according to the invention first comprises the step of detecting a first plurality of intensity courses on the value document transported past, in particular by means of a photodetector of the sensor or by means of several photodetectors of the sensor, as a function of time, while the value document is transported past the sensor for the purpose of checking it. The photodetector is, for example, a photodiode, a phototransistor, a photoresistor or else a photomultiplier, that is to say a light sensor which, in the simplest case, does not provide any spectral resolution and detects, for example, the entire luminescence spectrum or a part thereof as a respectively single measurement value. For this purpose, for example, suitable optical filters are positioned upstream of the photodetector, which filter out the excitation light and/or allow only a predetermined proportion of the luminescence spectrum to pass through. However, it is also conceivable in principle to employ a photodetector which supplies a spectral resolution.

The method according to the invention further comprises the step of combining the first plurality of intensity courses or a second plurality of intensity courses selected from the first plurality into a combined intensity course, and the step of determining a time constant $\tau$ of the combined intensity course.

The different intensity courses of the first plurality of intensity courses are detected, in particular simultaneously or sequentially, from different locations or capture regions on the value document, while the value document is transported past the sensor. The capture region is that region of the value document which is swept over by the detection region of the respective stationary photodetector of the sensor during the detecting of the intensity course associated with the excitation pulse.

In particular, the intensity courses of several different locations or capture regions on the value document enter into the combined intensity course. It is thereby achieved that the time constant of the luminescent substance can be determined more precisely from the combined intensity course, in particular in the case of a luminescent substance which is distributed in or on the value document and is partially covered by security elements. If the combined intensity course is established by combining the second plurality of intensity courses, the selection of the second plurality from the first plurality is preferably made such that the different intensity courses of the second plurality of intensity courses of different locations or capture regions have also been detected on the value document.

The different locations or capture regions are arranged on the value document in particular such that they do not overlap with each other. For example, a first intensity course of the first plurality of intensity courses in a first capture region on the value document and a second intensity course of the first plurality of intensity courses in a second capture region on the value document which is different from the first capture region are detected, as well as, where applicable, further intensity courses of the first plurality of intensity courses in further capture regions on the value document which are different from the first and second capture regions. Preferentially, the different locations or capture regions, in particular the first and second (and optionally the further) capture regions, are arranged successively along the transport direction of the value document on the value document and/or are arranged on the value document in different measuring tracks (running parallel to the transport direction and offset to each other perpendicular to the transport direction).

For example, at least one of the capture regions is located in a covered (e.g. overprinted) region of the value document in which there is a security element of the value document above the luminescent substance to be investigated, which reduces the luminescence intensity detectable from the luminescent substance, and at least another of the capture regions is located in a not-covered region of the value document in which there is no such security element above the luminescent substance to be investigated. Alternatively, or additionally, at least one of the capture regions can also be arranged at a boundary between such a covered and such a not-covered region of the value document and extend beyond this boundary. The luminescent substance of the value document can be present in some regions or over the full area on or in the value document.

To detect an intensity course of the first plurality of intensity courses, the excitation source of the sensor, which is preferentially designed as a light source, gives off an excitation pulse, preferentially in the form of a light pulse in the UV, VIS, NIR and/or IR region, for luminescence excitation of the security feature or of the luminescent substance. The properties of the excitation pulse (spectrum, duration, intensity, shape etc.) are in the process suitably adjusted for the luminescent substance to be excited or the luminescence to be excited. Typically, the duration of the excitation pulse lies in the range from 1 and 100 µs and is, for example, 1, 5, 10, 50 or 100 µs, wherein each of said values can also be a lower or upper limit of said range. Subsequent to the excitation pulse or its end, an intensity course is detected with the photodetector and the time response or the time of measurement or time points of measurement of the intensity course are indicated relative to the excitation pulse or relative to its end. In other words, the excitation pulse or the end of the excitation pulse defines the time point of measurement or the time of measurement zero. For example, the entire luminescence spectrum or—as mentioned above—a part thereof is employed for detecting the intensity course. In the process, the detected, discrete measurement or intensity values of the respective intensity courses are usually scalar values or are optionally combined to form scalar values, for example if the measurement values themselves have a spectral resolution. If, for example in the case of a spectrally resolving detector, a measurement value with several, for example spectrally, different components are present for each time point of measurement, the described method can, however, also be applied separately for one or more of these components.

The detected intensity courses preferentially respectively consist of a sequence of discrete intensity values which are detected or captured at respectively predetermined time points of measurement, that is to say at predetermined time points after or relative to the excitation pulse of the respective intensity course. Since the value document—especially at a high transport speed—continues to move by a certain distance along the transport direction during the detection of the discrete intensity values of the respective intensity course, the discrete intensity value is detected at the beginning of the respective intensity course by a different detection region of the value document than the discrete intensity value at the end of the respective intensity course. In each of the detected intensity courses, the discrete intensity values of the respective intensity course therefore originate from different detection regions of the value document. These detection regions of the respective intensity course form the capture region belonging to the respective intensity course. The detection regions of the respective capture region or of the respective intensity course are offset to each other along the transport direction, but—depending on the transport speed, scanning frequency and spatial resolution during the detection—can partially overlap with each other where applicable.

Preferentially, the time points of measurement of all intensity courses of the first plurality of intensity courses are identical, that is to say the discrete intensity values of the respective intensity courses are captured at the same time points after or relative to the respective excitation pulse. Furthermore, a predetermined end time point of measurement is preferably provided for the intensity courses, at which time point respectively the last discrete intensity value is detected, so that after this end time point of measurement the detection of a given intensity course has ended and the excitation pulse of the subsequent intensity course can be sent out. In the process, the plurality of discrete intensity values of a respectively given intensity course can be detected regularly or periodically, for example with a time interval or a period of 10 µs, 20 µs, 50 µs or 100 µs, which can be chosen, for example, in dependence on the expected characteristic decay time to of the luminescent substance to be determined. Correspondingly, the end time point of measurement, that is to say the discrete intensity value recorded with the greatest time interval from the excitation pulse, can also be chosen in dependence on the expected characteristic decay time of the luminescent substance to be detected. For example, the end time point of measurement, relative to the end of the luminescence excitation, lies at least at twice or three times or five times or ten times the characteristic time constant $\tau_0$. The end time point of measurement lies, for example, between 500 and 5000 µs and is, for example, 500, 1000, 1500, 2000, 3000, 4000 or 5000 µs, wherein each of said values can also be an upper and lower limit of said range. Correspondingly, it is not necessary to wait for the complete decay of the luminescence, but rather the next measurement can be started immediately after the end time point of measurement and the excitation pulse for the next intensity course can be sent out accordingly.

Particularly preferentially, the sequence or plurality of discrete measuring or intensity values consists only of precisely that number of intensity values which are necessary for the subsequent calculation of the time constant $\tau$. Accordingly, particularly preferentially, a given intensity course consists of precisely 2 or more than 2 intensity values, for example 3, 4, 5, 6, 8, 10 or more. For example, for the calculation of the time constant $\tau$ based on the decay quotient (Formula 1), which is explained in more detail below, only two intensity values are required (in the example at 10 µs and 1000 µs) in the case of an assumed monoexponential drop in the luminescence. If, in another embodiment, the time constant $\tau$ is determined on the basis of the calculation based on the derivative (Formula 2), which is explained in more detail below, only three intensity values are necessary (in the example at 990 µs, 1000 µs and 1010 µs). This makes possible a particularly rapid measurement and evaluation and thus a check at high transport speeds. However, the plurality of intensity values can also comprise a larger number of measurement values, which makes a more precise check possible.

In the simplest case, the first plurality of intensity courses, that is to say the totality of the intensity courses detected on a value document, is combined into a single common intensity course. Optionally, however, for example a step of selecting a second plurality of intensity courses from the first plurality of intensity courses before combining the intensity courses is also provided, and merely the second plurality of intensity courses is combined into a single common intensity course. The selection of the second plurality from the first plurality in the process preferentially takes place on the basis of a suitable selection criterion of the respective intensity course in order to select accordingly as far as possible only the intensity courses suitable for the combination. The selection criterion preferentially relates to the strength of the intensity detected in an intensity course and is fulfilled, for example, precisely when an intensity value of the respective intensity course or a value derived therefrom (e.g. the signal-to-noise ratio) reaches or exceeds a predetermined threshold value at a predetermined time point of measurement. The predetermined time point of measurement lies preferably at the beginning of the respective intensity course and/or in the vicinity or shortly after the end of the excitation pulse, particularly preferentially at the first time point of measurement detected after the end of the excitation pulse, for example at a time point of measurement of 10 µs, 20 µs, 50 µs or 100 µs. Correspondingly, intensity courses with a low signal-to-noise ratio are sorted out and only intensity courses with a high signal-to-noise ratio are used for combining to form a common intensity course. In the process, the second plurality of intensity courses is less than or equal to the first plurality of intensity courses, the latter when all the detected intensity courses of the first plurality meet the chosen selection criterion, that is to say have, for example, a sufficiently large signal-to-noise ratio.

The combining of the first or second plurality of intensity courses into a single combined intensity course is then effected component-by-component, that is to say the combining is effected by respectively combining the intensity values of the intensity courses to be combined at respectively the same time points of measurement, that is to say relative to the respective excitation pulse. In other words, in the component-by-component combination of the intensity courses, respectively those intensity values are combined which have the intensity courses at the respective corresponding time point of measurement after the end of the respective excitation pulse. Correspondingly, it is in the process advantageous if—as described above—the discrete intensity values of all intensity courses are detected at respectively identical time points of measurement, or all intensity courses have the same sequence of time points of measurement. Correspondingly, the combined intensity course then also has the same number of intensity values as the intensity courses to be combined, that is to say as the first or second plurality of intensity courses, and also the same time points of measurement. However, insofar as the intensity values of the intensity courses to be combined are captured at different time points of measurement, the intensity courses to be combined can, for example, be interpolated and/or extrapolated before being combined. The intensity values of several different detection regions (which lie in different capture regions on the value document) enter into each of the combined intensity values which form the combined intensity course, wherein the different detection regions, the intensity values of which enter into the same combined intensity value, preferably do not overlap with each other.

The component-by-component combination of respectively the plurality of intensity values of the plurality of intensity courses to be combined at a given time point of measurement is effected, for example by (component-by-component) addition, (component-by-component) averaging or (component-by-component) quantile determination, in particular median determination.

As a result, a single combined intensity value for the combined intensity course thus results for each predetermined time point of measurement.

The method according to the invention further comprises the step of determining a time constant $\tau$ of the combined intensity course.

Usually, the decay behavior or the intensity course after a pulsed excitation of the luminescence to be detected of the luminescent substance to be checked is approximately mono-exponential, for which purpose, where applicable, for example with the help of an optical filter positioned upstream of the photodetector, a suitable section of the luminescence spectrum is chosen which, for example, originates from a single luminescent state transition of the luminescent substance. For example, the luminescent substance or the security feature emits precisely one type of luminescence, that is to say luminescence which originates from a single luminescent state transition of the luminescent substance, so that correspondingly the entire luminescence spectrum can be employed for the detection of the intensity values of the intensity course with at the same time a mono-exponential drop. For example, the value document contains only precisely one luminescent substance.

Correspondingly, the determination of the time constant $\tau$ of the combined intensity course can then be carried out on the combined intensity course via a non-linear least-square fit of a mono-exponential decay curve, or on the logarithmized, combined intensity course via a linear least-square fit. Alternatively, the time constant can also be carried out via the decay quotient of the combined intensity course (see Formula 1), the derivative function of the combined intensity course (see Formula 2) or the antiderivative function of the combined intensity course.

$$\tau = -\frac{T_2 \to T_1}{\ln(I(T_2)/I(T_1))} \quad \text{(Formula 1)}$$

$$\tau = -2\Delta \cdot \frac{I(T)}{I(T+\Delta) - I(T-\Delta)} \quad \text{(Formula 2)}$$

As can be seen from both of the above formulas, when a mono-exponential decay is assumed, the time constant $\tau$ can be determined on the basis of only two or three intensity values of the intensity course. Correspondingly, for detecting the first plurality of intensity courses, it is in the process sufficient to detect only two or three intensity values (at suitable time points of measurement relative to the excitation pulse) respectively for all detected intensity courses. Correspondingly, the computational effort when combining the intensity courses into a combined intensity course, which is usually determined precisely once per value document, is also reduced. Even in the case of a non-mono-exponential decay, a time constant can be determined analogously to the described methods from, for example, two or three intensity values of the intensity course.

In the method according to the invention, the value document is checked on the basis of the determined time constant $\tau$ of the combined intensity course, in particular with regard to its authenticity and/or with regard to its value-document type (e.g. denomination), for example by comparing the determined time constant $\tau$ with the (expected) characteristic time constant $\tau_{=0}$ of the luminescent substance and, in dependence on this, classifying the value document with regard to its authenticity or its value-document type. Thus, for example, it can be checked whether or not the difference of the determined time constant $\tau$ from the expected characteristic time constant $\tau_0$ of the luminescent substance, or its ratio, undershoots or exceeds a selected threshold value, and for example in the event of being exceeded, the value document can be classified as authentic or forged.

The transporting past the sensor according to the invention of the value documents to be checked is effected, for example, with the help of a transport device with which the value documents are transported past the sensor preferably at a predetermined constant transport speed during the measurement, so that during the luminescence excitation or during the excitation pulse as well during the detecting of the plurality of intensity courses and their intensity values, the value documents move relative to the stationary sensor at the predetermined, constant transport speed.

In the simplest case, the excitation source or the excitation pulse given off by the excitation source excites the value document to luminescence over the full area. Particularly preferentially, however, a given excitation pulse of the excitation source excites the value document to luminescence only in a partial region which comprises at least the capture region on the value document which belongs to the excitation pulse or to the subsequent intensity course. This capture region is that region of the value document which is swept over by the detection region of the stationary detector or photodetector of the sensor during the detecting of the intensity course belonging to the excitation pulse up to the end time point of measurement.

Accordingly, depending on the set transport speed, the chosen end time point of measurement and the length of the value document in the transport direction, a large number of intensity courses can easily be detected sequentially per value document, for example per bank note. If, for example, the transport speed is 10 m/s, the duration of the excitation pulse is 10 µs and the end time point of measurement is 1 ms, the value document thus moves by 10 mm during the detection of an intensity course. Since the excitation pulse of the next intensity course to be detected can be given off immediately following the end time point of measurement, one intensity course per centimeter can thus be detected essentially with one photodetector. For a value document having a length of 10 cm, ten intensity courses can thus be detected sequentially or locally one after another or with a measuring track. For example, the first plurality is 2, 3, 4, 6, 8, 10, 12, 16, 20, 25, 30, 40, 50, 70, 100 or respectively more. Preferentially the first plurality of detected intensity courses is at least 4, particularly preferentially at least 8, since the component-by-component averaging is then more robust against a single outlier measurement value.

A sensor according to the invention has one or more photodetectors for detecting respectively one intensity course of the luminescence which the value document, excited by the excitation source, sends out in a detection region. In the simplest case, the sensor has precisely one measuring track along which the first plurality of intensity courses is detected. However, it can also have several measuring tracks. In particular, the sensor comprises precisely one photodetector per measuring track for detecting intensity courses of the luminescence which the value document, excited by the excitation source, respectively sends out in the detection region of the photodetector.

In a preferred embodiment, the first plurality of intensity courses on the value document transported past is detected by (precisely) one photodetector of the sensor, which detects the intensity courses of the first plurality of intensity courses on the value document transported past as a function of time, while the value document is transported past the sensor or photodetector for the purpose of checking it. The photodetector detects the different intensity courses of the first plurality of intensity courses sequentially from different locations or capture regions on the value document.

In particular, in this embodiment, the photodetector sequentially detects a first intensity course of the first plurality of intensity courses in a first capture region on the value document, and a second intensity course of the first plurality of intensity courses in a second capture region on the value document which is different from the first capture region and which is arranged along the transport direction of the value document after the first capture region on the value document, as well as, where applicable, further intensity courses of the first plurality of intensity courses in further capture regions on the value document which are different from the first and second capture regions and which are arranged along the transport direction of the value document after the first and second capture regions on the value document. In particular, the first and second (and, where applicable, the further capture regions) are arranged on the value document such that they do not overlap with each other.

However, the first plurality of intensity courses on the value document transported past can also be detected by a plurality of photodetectors of the sensor which are arranged offset with respect to one another perpendicular to the transport direction of the value document and detect the luminescence of the value document in measurement tracks running parallel to one another. The different intensity courses of the first plurality of intensity courses detect the photodetectors (simultaneously or sequentially) from different locations or capture regions on the value document, while the value document is transported past the sensor or the photodetectors. One or more intensity courses can in the process be detected per measuring track.

If only one intensity course of the first plurality of intensity courses is detected in each measuring track, then the first plurality of intensity courses comprises only one intensity course per measuring track. For example, a combined intensity course of the respective measuring track is established for each measuring track from the intensity courses detected by the respective photodetector, and on the basis of this respectively one time constant is determined for the respective measuring track. From these time constants, an average time constant for the luminescent substance of the value document can then be established, on the basis of which the value document is checked. Alternatively, the value document can also be checked on the basis of the individual time constants of the individual measuring tracks.

In a particularly preferred embodiment, the first plurality of intensity courses comprises the intensity courses of two or more measurement tracks and respectively several intensity courses per measurement track. In the particularly preferred embodiment, the first plurality of intensity courses is detected by two or more photodetectors of the sensor, which are arranged offset to each other perpendicular to the transport direction of the value document and detect the luminescence of the value document in measuring tracks running parallel to each other. In particular, each of these photodetectors detects, along its measuring track, a plurality of intensity courses of the first plurality of intensity courses sequentially from different locations or capture regions on the value document. The first plurality of intensity courses then respectively comprises several intensity courses of two or more measuring tracks. The intensity courses of a two-dimensional arrangement of locations or capture regions on the value document then enter into the intensity course combined from these intensity courses. As a result, it is attained that the time constant of the luminescent substance can be determined particularly accurately from the combined intensity course, in particular in the case of a luminescent substance which is distributed in the value document and is partially covered by security elements.

The sensor according to the invention has a control device for controlling the photodetector(s), which is designed to drive the photodetector(s) such that it/they detect(s) the first plurality of intensity courses on the value document, while the value document is transported past the sensor or the photodetector. The control device is configured, in particular, to drive the photodetector or the photodetectors such that the photodetector or the photodetectors detect(s) the first plurality of intensity courses from different locations or capture regions on the value document. The different locations or capture regions are in the process arranged on the value document in particular such that they do not overlap with each other. The control device can be designed to drive the respective photodetector such that it detects different intensity courses of the first plurality of intensity courses sequentially from different locations or capture regions on the value document. The control device can also be designed to control the respective excitation source, in particular in order to cause it to emit the excitation pulses for the first plurality of intensity courses.

Furthermore, the sensor according to the invention comprises an evaluation device which is designed for combining the first plurality of intensity courses or a second plurality of intensity courses selected from the first plurality into a combined intensity course (e), for determining a time constant $\tau$ of the combined intensity course, and for checking the value document on the basis of the time constant $\tau$ of the combined intensity course. The evaluation device is designed in particular to carry out a check of the value document as described above, in particular with regard to its authenticity and/or with regard to its value document type (e.g. denomination). The control device and the evaluation device can also be integrated in one control and evaluation device.

In a preferred embodiment, the sensor has a multiplicity of measuring tracks, for example 2, 3, 4, 5, 6, 8 or 10 measuring tracks. For this purpose, the sensor preferably comprises a corresponding multiplicity of photodetectors, for example 2, 3, 4, 6, 8 or 10 photodetectors, which, when the sensor is arranged as intended, are arranged in an apparatus for checking preferentially transversely or perpendicularly to the transport direction. Correspondingly, the excitation source is devised, for example, to excite all capture regions of the multiplicity of photodetectors. Alternatively, a separate excitation source can also be provided for each photodetector. Such a multiplicity of measuring tracks favors the detecting of a large number of intensity courses as the first plurality.

In general, the reliability of the check according to the invention is improved the greater the first plurality is and/or the stricter the selection criterion for selecting the second plurality can be chosen.

In particular, on a value document transported past, the first plurality of intensity courses is detected one after another, in the case of precisely one measuring track of the sensor exclusively in the transport direction one after another, that is to say sequentially. In the case of a plurality of measuring tracks, the first plurality of intensity courses can be detected both side by side and one after another, that is to say sequentially and in parallel or at the same time.

The features described for the method according to the invention apply correspondingly to the sensor according to the invention, in particular to its control device and/or evaluation device, and vice versa.

An apparatus according to the invention for processing value documents correspondingly comprises a sensor as described above, as well as a transport device for transporting the value documents past the sensor at usually a predetermined, constant transport speed. In the process, the control device of the sensor is devised to drive the excitation source(s) of the sensor such that it/they excite with (respectively) one excitation pulse one or more partial regions of the value document to luminescence, in particular one or more capture regions which is/are swept over by the detection region of the detector of the sensor during the detecting of the respective intensity course.

BRIEF DESCRIPTION OF THE DRAWINGS

Further advantages of the invention will be described hereinafter on the basis of the embodiment example explained in the accompanying figures. The exemplary embodiment represents a preferred embodiment which in no way limits the invention. The figures shown are schematic representations which do not necessarily reflect the real proportions, but rather serve for improved clarity of the embodiment example. Specifically, the figures show.

DETAILED DESCRIPTION OF VARIOUS EMBODIMENTS

Figure 1:
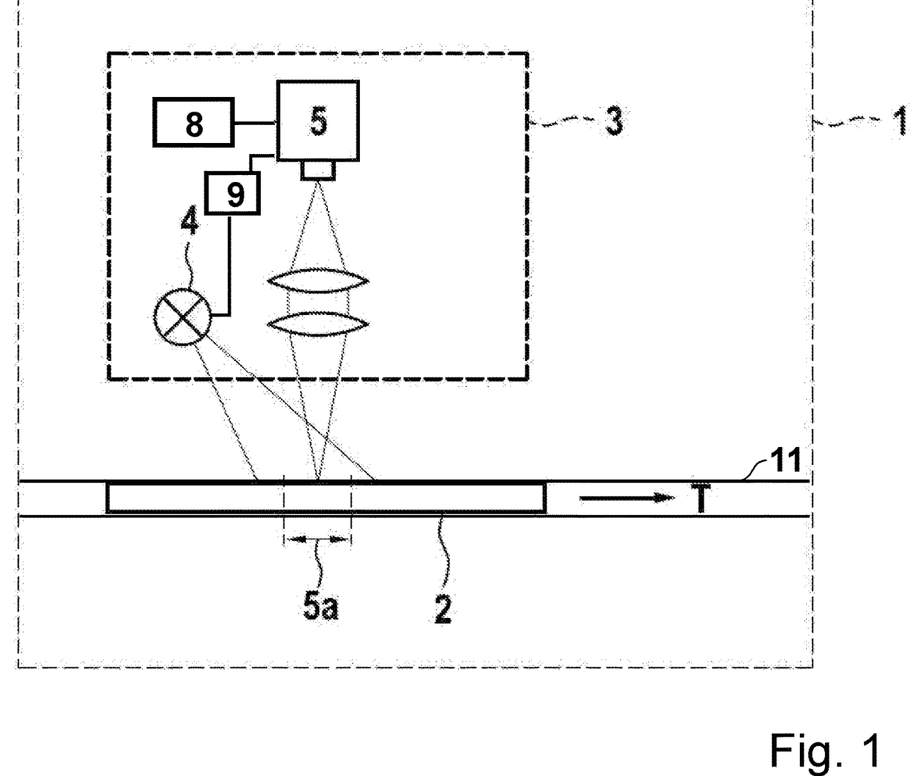
FIG. 1 a schematic view of an embodiment example with a value document and a stationary sensor in an apparatus for processing value documents.

FIG. 1 schematically shows a detail of an apparatus 1 for processing value documents 2 which can be designed for checking and optionally sorting the value documents. In it a value document 2, in the present case a bank note, is transported past a sensor 3 along a transport direction at a constant speed of, for example, 10 m/s with the help of a transport device (transport belt 11 or transport rollers) of the apparatus 1. In the present case, the sensor 3 consists of an excitation source 4 in the form of a pulsed light source which, with the aid of the excitation pulses or light flashes having a duration of for example 10 µs, respectively excites at least one partial region of the value document 2. The sensor 3 further comprises a photodetector 5, in the present case in the form of a photodiode, on whose light-sensitive region a surface of the value document 2 is imaged, for example as schematically represented in FIG. 1 with the aid of two lenses. An optical filter, for example for shielding the excitation light and/or for selecting the spectral component of the luminescence to be detected, can furthermore be provided between the lenses. In the present embodiment example, a circular detection region 5a with a diameter of 5 mm results from the area of the light-sensitive region of the photodetector due to the enlargement of the optical imaging in the plane of the value document 2. Furthermore, the stationary sensor 3 comprises an evaluation device 8 which reads out the detected intensity values of the photodetector 5 and carries out the checking of the value document. The control device 9 initiates the sending out of the excitation pulses of the excitation source 4 and the detecting of the measurement values with the photodetector 5.

Figure 2:
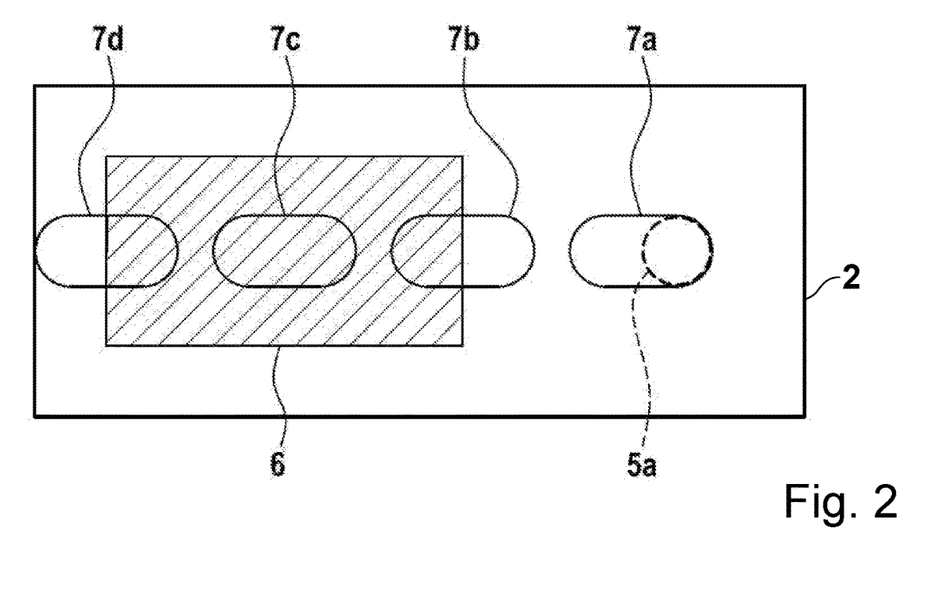
FIG. 2 a plan view of a value document.

In FIG. 2, the value document 2 transported in transport direction T is shown in plan view. Here, the luminescent substance is uniformly distributed in value document 2, wherein the value document 2 is provided in a partial region with an intensity-reducing overprinting 6 which reduces the existing intensity of the detectable luminescent radiation to 10% of the remaining, not-covered region of the value document 2.

Figure 3:
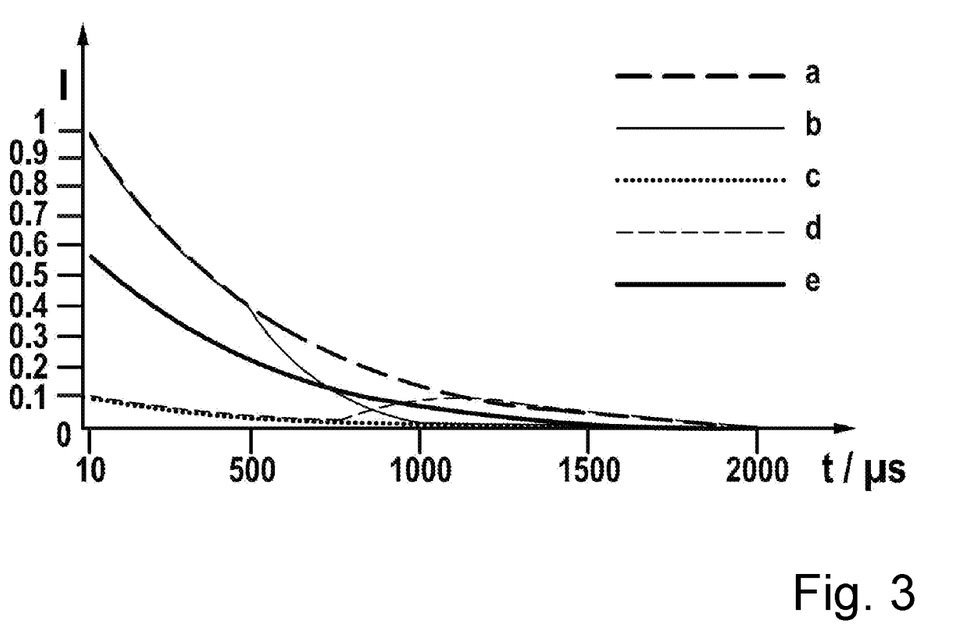
FIG. 3 a diagram with intensity courses.

Furthermore, FIG. 2 shows the capture regions 7a-7d of four intensity measurements a-d which are respectively swept over by the detection region 5a of the photodetector 5 during the detection of the intensity courses. The detection region 5a shown in dashed lines in FIG. 2 corresponds to the detection region of the photodetector 5 at the beginning of the first measurement a, that is to say at its time point of measurement zero, at or immediately after the end of the excitation pulse associated with this measurement. During the four measurements a to d outlined by way of example in FIG. 2, the intensity courses a to d schematically illustrated in FIG. 3 are detected. In the process, the respectively associated excitation pulse excites at least the respective capture region 7a to 7d. Shown are respectively measurements with a duration of 2 ms, in which the value document 2 moves by 20 mm at a transport speed of 10 m/s. As can be seen from FIG. 2, the first measurement a takes place in the capture region 7a, which is located exclusively in the not-covered region of the value document 2. Correspondingly, an intensity course not falsified by the spatial structures of the value document 2 is detected here (intensity course a in FIG. 3). The intensity course a detected in measurement a therefore decreases mono-exponentially with a decay constant of 500 µs in the present case.

During the subsequent measurement b, the capture region 7b lies both in the not-covered region of the value document 2 and in the overprinted region 6 and sweeps over a leading edge of the overprinted region 6. At the beginning of the measurement, after giving off the relevant excitation pulse, the detection region 5a lies still completely in the not-covered region. After 500 µs, the detection region 5a begins to enter the overprinting 6 and at 1000 µs lies completely in the overprinted region. Therefore, the intensity course b detected in the measurement b begins to drop at a time of measurement of 500 µs (in addition to the exponential drop) and reaches an intensity value of 10% of the undistorted intensity value at a time of measurement of 1000 µs and then further drops off exponentially.

The third measurement c takes place exclusively in the overprinted region. Correspondingly, an exclusively monoexponential drop results here (intensity course c in FIG. 3) which, however, amounts to only 10% of the intensity of intensity course a at each time point of measurement.

During the fourth measurement d, the capture region 7d again sweeps over an edge, here the trailing edge of the overprinting 6, so that the measurement first begins in the overprinted region. At a time point of measurement of 700 µs, the detection region 5a begins to emerge from the overprinting 6, so that here (see intensity course d in FIG. 3) an increase of the intensity results, so that as of a time point of measurement of 1200 µs the intensity measured in measurement d corresponds to the intensity of the intensity course a.

Furthermore, FIG. 3 illustrates the intensity course combined component-by-component, which results from component-by-component averaging of the four intensity courses a to d. The time constant $\tau$ is then determined on the basis of the combined intensity course e. In the present case this is done on the basis of the decay quotient according to above Formula 1, wherein for this purpose the intensity values at the time points of measurement 10 µs and 1000 µs are employed. For comparison, the decay time $\tau$ determined according to the derivative function (Formula 2) is also shown, with T=1000 µs and $\Delta$=10 µs, wherein for this purpose the intensity values at the time points of measurement of 990 µs, 1000 µs and 1010 µs are employed (which are not explicitly listed in the table, however).

The table below shows the various detected intensity values and the decay times obtained therefrom.

|  | Intensity values | | Time constant $\tau$ avg. | |
| --- | --- | --- | --- | --- |
|  | 10 µs | 1000 µs | (Formula 1) | (Formula 2) |
| Intensity course a | 0.9802 | 0.1353 | 500 µs | 500 µs |
| Intensity course b | 0.9802 | 0.0257 | 273 µs | 87 µs |
| Intensity course c | 0.0980 | 0.0135 | 500 µs | 500 µs |
| Intensity course d | 0.0980 | 0.0744 | 3387 µs | −785 µs |
| Average of the time constant (prior art) |  |  | 1165 µs | 75 µs |
| Intensity values or time constant of the combined intensity course (invention) | 0.53911 | 0.0622 | 459 µs | 500 µs |
| Actual time constant of the luminescence: |  |  |  | 500 µs |

It can be seen from the measurements a and c, in which no edge of the overprinting 6 is swept over during the detecting of the intensity course (capture regions 7a and 7c), the correct, actual decay time or time constant $\tau_{=0}$ von 500 µs results with both calculation methods according to Formula 1 as well as Formula 2. However, as soon as the spatial structures, in the present case the edges of the overprinting 6, of the value document 2 are swept over during the detecting of an intensity course (measurements b and d; capture regions 7b and 7d), completely incorrect decay times (negative decay time of −785 µs) result in both calculation methods. The shown time-constant averaging, which is characterized as prior art and based on the time constants $\tau$ determined in the four measurements (intensity courses a to d), also results respectively in averaged time constants $\tau$ of 1165 µs or 75 µs, which deviate markedly from the actual value of 500 µs.

If, on the other hand, as described in the present case, the intensity values of the four individual courses a to d are first combined component-by-component, that is to say respectively at the same time points of measurements, into a common intensity course (combined intensity course e) and the time constant $\tau$ is only determined therefrom in accordance with the Formulae 1 and/or 2, then time constants $\tau$ result with both calculation methods which do not deviate or deviate only slightly, from the actual value of $\tau_0$=500 µs.

In the embodiment example illustrated above, on the basis of the four measurements a to d, the intensity courses typically occurring during a determination of the luminescence drop, of which a subset is falsified due to the spatial structures of the value document 2, are illustrated merely by way of example. However, the greater the number of detected intensity courses, which are initially combined to form a common intensity course, the closer statistically the combined intensity course will lie to the undistorted decay curve of the luminescent substance (scaled by a factor which reflects the average coverage/shielding yet does not matter in the calculation of the time constant $\tau$) and accordingly the closer the time constant $\tau$ determined on the combined intensity course will lie to the actual value $\tau_0$.

Thus, the present invention provides an approach for determining a time constant $\tau$ which reliably deviates only slightly from the (expected) characteristic time constant $\tau_0$ of the luminescent substance employed, and which in the process is largely independent of the spatial structures specifically present on the value document 2 and thus requires no knowledge of the actual local distribution of the luminescent substance or of any shielding on the value document 2. Thus, the present invention can be applied to many value documents designed differently in terms of the distribution of the luminescent substance or any shielding, without requiring knowledge of the position of the corresponding spatial structures.

The invention claimed is:

1. A method for checking value documents which are transported for their checking past a sensor in a transport direction, and which have a security feature with a luminescent substance which, as a reaction to a luminescence excitation by an ultraviolet radiation, visible light, near-infrared radiation, and/or infrared radiation source, emits a luminescence which has, as a function of time t, an intensity course with a characteristic time constant $\tau 0$, having the following steps:
    detecting a first plurality of intensity courses on a value document,
    combining the first plurality of intensity courses or a second plurality of intensity courses selected from the first plurality into a combined temporal intensity course,
    determining a time constant $\tau$ of the combined temporal intensity course,
    checking the value document, with regard to its authenticity and/or with regard to its value-document type, on the basis of the time constant $\tau$ of the combined temporal intensity course.

2. The method according to claim 1, wherein precisely one type of luminescence is detected and/or the luminescent substance emits precisely one type of luminescence and/or the value document has precisely one luminescent substance and/or the intensity course of the luminescence is monoexponential.

3. The method according to claim 1, wherein the ultraviolet radiation, visible light, near-infrared radiation, and/or infrared radiation source gives off an excitation pulse, a light pulse, for luminescence excitation, and in that the detected intensity courses are respectively composed of a sequence of several, precisely two or three, discrete intensity values which are detected at respectively predetermined measurement times relative to the excitation pulse, respectively up to a predetermined end time point of measurement.

4. The method according to claim 1, comprising the further step of:
selecting the second plurality of intensity courses from the first plurality on the basis of a selection criterion,
wherein the selection criterion is met when an intensity value at a predetermined time point of measurement, or a value derived therefrom, reaches or exceeds a predetermined threshold value,
wherein the predetermined time point of measurement is the first time point of measurement after the end of the respective luminescence excitation, including the first time point of measurement after the end of the respective excitation pulse.

5. The method according to claim 1, wherein the value documents are transported past the sensor at a transport speed in the range of 1 to 12 m/s.

6. The method according to claim 1, wherein the characteristic time constant $\tau 0$ of the luminescence of the value document lies in the range of 10 μs to 5 ms.

7. The method according to claim 1, wherein the combining of the first or second plurality of intensity courses is effected component-by-component,
wherein the component-by-component combining is effected by addition, averaging, quantile or median determination of the first or second plurality of intensity courses.

8. The method according to claim 1, wherein the determination of the time constant $\tau$ of the combined temporal intensity course is carried out via a non-linear least-square fit, a linear least-square fit to the logarithmized intensity course, the decay quotient, the derivative function or the antiderivative function.

9. The method according to claim 1, wherein the value documents are transported past the sensor at a predetermined, constant transport speed, and/or that the ultraviolet radiation, visible light, near-infrared radiation, and/or infrared radiation source excites the value document over the full area or excites the value document at least in a partial region which contains a capture region which is swept over by a detection region of a photodetector of the sensor during the detecting of the respective intensity course.

10. The method according to claim 9, wherein the value documents are transported past the sensor by a transport device.

11. The method according to claim 1, wherein the first plurality is 2, 3, 4, 6, 8, 10, 12, 16, 20, 25, 30, 40, 50, 70, 100 or more.

12. The method according to claim 1, wherein the first plurality is at least 4.

13. The method according to claim 1, wherein the first plurality of intensity courses is detected, sequentially, from different locations on the value document,
wherein the first plurality of intensity courses is detected in the transport direction one after another, side by side and one after another, or exclusively one after another.

14. A sensor for checking value documents, comprising:
at least or precisely one ultraviolet radiation, visible light, near-infrared radiation, and/or infrared radiation source for exciting a luminescence of a value document, and
one or more photodetectors for detecting an intensity course of the luminescence which the value document, excited by the ultraviolet radiation, visible light, near-infrared radiation, and/or infrared radiation source, sends out in a detection region,
a control device which is designed for driving the photodetector(s) such that the photodetector(s) detect(s) a first plurality of intensity courses on the value document,
an evaluation device which is designed for
combining the first plurality of intensity courses or a second plurality of intensity courses selected from the first plurality into a combined temporal intensity course,
determining a time constant $\tau$ of the combined temporal intensity course,
checking the value document on the basis of the time constant $\tau$ of the combined temporal intensity course, with regard to its authenticity and/or with regard to its value-document type.

15. The sensor according to claim 14, wherein the sensor, including the control device and/or the evaluation device, is designed for carrying out the method according to a method for checking value documents which are transported for their checking past a sensor in a transport direction, and which have a security feature with a luminescent substance which, as a reaction to a luminescence excitation by an ultraviolet radiation, visible light, near-infrared radiation, and/or infrared radiation source, emits a luminescence which has, as a function of time t, an intensity course with a characteristic time constant $\tau 0$, having the following steps:
detecting a first plurality of intensity courses on a value document,
combining the first plurality of intensity courses or a second plurality of intensity courses selected from the first plurality into a combined temporal intensity course,
determining a time constant $\tau$ of the combined temporal intensity course,
checking the value document, with regard to its authenticity and/or with regard to its value-document type, on the basis of the time constant $\tau$ of the combined temporal intensity course.

16. An apparatus for processing value documents, having a sensor according to claim 14 having a transport device for transporting the value documents past the sensor,
wherein the control device of the sensor is devised to drive the ultraviolet radiation, visible light, near-infrared radiation, and/or infrared radiation source such that the ultraviolet radiation, visible light, and/or infrared radiation source excites the luminescence precisely or at least one capture region on the value document which is swept over by the detection region during the detecting of the respective intensity course.

* * * * *